United States Patent [19]

Hill et al.

[11] 3,892,856

[45] July 1, 1975

[54] TOPICAL STEROID FORMULATION

[75] Inventors: John Anthony Hill, East Brunswick; Rudolfo Cilento, North Brunswick, both of N.J.

[73] Assignee: E. R. Squibb & Sons, Inc., Princeton, N.J.

[22] Filed: Apr. 10, 1974

[21] Appl. No.: 459,754

[52] U.S. Cl. ..................... 424/241; 260/239.55 D
[51] Int. Cl.$^2$ .................................. A61K 17/00
[58] Field of Search............ 260/239.55 D; 424/241

[56] References Cited
UNITED STATES PATENTS
3,312,591   4/1967   Elks et al. .............................. 167/58
3,740,392   6/1973   Heider .................................. 424/241

OTHER PUBLICATIONS

J. Org. Chem. (1962) by Bernstein et al., Vol. 27, Pages 690–692.

*Primary Examiner*—Elbert L. Roberts
*Attorney, Agent, or Firm*—Lawrence S. Levinson; Merle J. Smith; Burton Rodney

[57] ABSTRACT

A steroid formulation having enhanced properties for topical application comprises 21-chloro-9$\alpha$-fluoro-$\Delta^4$-pregnene-11$\beta$,16$\alpha$,17$\alpha$-triol-3,20-dione 16,17-acetonide dissolved in polyethylene glycol and the solution dispersed in an oleaginous material.

21 Claims, No Drawings

TOPICAL STEROID FORMULATION

OBJECT OF THE INVENTION

It is an object of the present invention to provide improved compositions for the topical application of 21-chloro-9α-fluoro-Δ⁴-pregnene-11β,16α,17α-triol-3,20-dione 16,17-acetonide. Another object is to provide methods for the preparation of these compositions. Still another object is to provide a composition which is non-stinging and non-irritating. Still another object is to provice a composition which is effective in treating dermatitis. These and other objects of the present invention will be apparent from the following description.

SUMMARY OF THE INVENTION

The present invention provides a steroid compositing having enhanced properties for topical application. The steroid employed in the present invention is 21-chloro-9α-fluoro-Δ⁴-pregnene-11β,16α,17α-triol-3,20-dione 16,17-acetonide. The compositions according to the present invention comprise the foregoing steroid dissolved in polyethylene glycol and the foregoing composition dispersed in an oleaginous material. Preferably the solution of steriod in polyethylene glycol is a saturated solution. In addition, part of the total amount of steroid present in the composition may be dispersed in the oleaginous material. The polyethylene glycol is present in an amount of from about 1% by weight to about 35% by weight based on total weight of the composition. The oleaginous material is present in an amount of from about 65% by weight to about 99% by weight based on total weight of the composition.

DETAILED DESCRIPTION

The present invention provides a composition for topical application of a steroid wherein the steroid is dissolved in polyethylene glycol and the foregoing composition is dispersed in an oleaginous material. The polyethylene glycol preferably contains at least about 80% of that amount of steroid required to form a saturated solution of the steroid in the polyethylene glycol; and most preferably the polyethylene glycol contains a saturated solution of the steroid.

The polyethylene glycol which may have a molecular weight of from about 200 to about 7500 is present in an amount of from about 1% by weight to about 35% by weight, preferably from about 2.5% by weight to about 25% by weight based on total weight of the composition.

Examples of oleaginous material are petrolatum and mineral oil thickened or gelled with polyethylene. Petrolatum (petroleum jelly) is a purified mixture of semisolid hydrocarbons from petroleum having a melting point of from about 45° to about 65°C, preferably from about 50° to about 60°C. When the mixture of steroid and polyethylene glycol is mechanically dispersed in the oleaginous material, the latter may be mineral oil thickened with polyethylene as disclosed in U.S. Pat. Nos. 2,627,938, 2,628,187 and 2,628,205. The disclosures of the foregoing patents are incorporated herein by reference. The oleaginous material is present in an amount of from about 65% by weight to about 99% by weight, preferably from about 70% by weight to about 95% by weight, based on total weight of the composition.

The steroid, 21-chloro-9α-fluoro-Δ⁴-pregnene-11β,16α,17α-triol-3,20-dione 16,17-acetonide, may be present in a total amount of from about 0.01% by weight to about 0.5% by weight, preferably from about 0.025 to about 0.2% by weight, based on total weight of the composition. In addition to that portion of the steroid dissolved in the polyethylene glycol, a portion of the steroid may be suspended in the oleaginous material, thus providing a reservoir of steroid to replenish that removed from the polyethylene glycol solution during topical application.

The compositions of the present invention may also contain up to about 5% by weight of a bodying agent, e.g. polyethylene glycol 6000 distearate and up to about 7% of a dispersing modifier, e.g., hydroxylated lanolin, or Polyoxyethylene (20) Sorbitan Tristearate (Tween 65 or Polysorbate 65).

When the oleaginous material is petrolatum, the compositions of the present invention may be prepared by heating the polyethylene glycol phase to slightly above its melting point (approximately 65°C), adding the steroid, and continuing the heating with agitation until the desired solubilized level of steroid is dissolved in the polyethylene glycol. Generally this is effected in a few minutes to about an hour. The petrolatum which has been separately melted is then added to the mixture of steroid and polyethylene glycol and the resulting composition allowed to cool while continuing the agitation until congealing begins. Satisfactory preparations may also be prepared by reversing the above process, i.e., adding the glycol phase to the melted petrolatum and agitating until congealing begins. Generally congealing takes place at a temperature of from about 40° to about 50°C. The resulting composition is a dispersion wherein the petrolatum is the continuous phase and the discontinuous phase is the polyethylene glycol having the steroid dissolved therein.

Alternatively, the composition of the present invention may be prepared by heating the polyethylene glycol phase to slightly above its melting point (approximately 65°C), adding the level of steroid to be dissolved and continuing the heating with agitation until solubility of the steroid results. Generally this is effected in a few minutes to about an hour.

The composition is then allowed to cool with continued agitation until it becomes unctuous (temp. approximately 35°C).

The glycol phase is then mixed preferably in a planetary type mixer, e.g., Glen or Hobart type mixer, with approximately 10 to 20% of the desired quantity of petrolatum and the mixture passed through a 3 roll type roller mill. The remainder of the required quantity of petrolatum is added to the milled mixture and mixed until uniform.

When a portion of the steroid is to be present as a micro-particulate dispersion of the solid steroid particles in petrolatum, the following modification of the procedure is indicated.

Approximately 10% of the required quantity of petrolatum is withheld and melted by heating to slightly above its melting point and to this is added the required amount of powdered steroid in micronized form having a particle size of from about 5 to about 50 microns. The mixture is milled, preferably using a rotor-stator type mill (e.g., Homomixer, Colloid Mill, Gifford Wood type) until a uniform dispersion results. The milled fraction is allowed to cool and congeal and then added the main batch preferably in a planetary type mixer lobart type mixer) and mixed until uniform.

When the oleaginous material is mineral oil gelled th polyethylene, the compositions of the present invention may be prepared by melting the dispersing odifier with heating to a temperature of approximately 65° to 70°C. and slowly adding to the gelled oil ase while mixing, preferably in a planetary type ixer, e.g., Groen or Hobart type. The steroid to be lubilized is dissolved in the molten polyethylene glycol phase heated to slightly above its melting point (approximately 65°C). The hot steroid solution is added )wly to the batch with slow speed agitation and the tch allowed to cool to room temperature.

When a portion of the steroid is to be present as a microparticulate dispersion of solid steroid particles in e mineral oil gelled with polyethylene, the following odification of the above procedure is indicated. Approximately 10% of the required quantity of the lled mineral oil is withheld from the batch and processed as follows: A concentrate of the particulate steroid in micronized form having a particle size of from out 5 to about 50 microns is prepared by mixing the roid with a portion of the gelled mineral oil, preferably in a planetary type mixer, e.g., Hobart type. The ncentrate is passed through a three roll type roller ill and diluted with the required amount of mineral oil lled with polyethylene using a planetary type mixer. lis particulate dispersion of the steroid is added to the ain portion of the batch and mixed until uniformm ing slow speed mixing, preferably in a planetary type ixer.

Alternatively, the product may be prepared as follows:

The required amount of gelled mineral oil is warmed approximately 40°–45°C. The dispersing modifier, if quired, is melted by heating to approximately °–70°C. and added slowly to the batch with slow eed mixing, preferably using a planetary type mixer, ;., Groen or Hobart type. The steroid to be solubied is dissolved in the molten polyethylene glycol iase heated to slightly above its melting point (approximately 65°C.). The hot steroid solution is added )wly to the batch with slow speed agitation.

The warm batch is then passed through a static mixer ing a high capacity low shear screw type pump, e.g., oyno type, and allowed to cool to room temperature. hen a portion of the steroid is to be present as a microparticulate dispersion of the solid steroid particles, e previous process modification is applicable.

By using a high shear disperser, the required quantity surfactant can be greatly reduced and may even be minated completely. The high shear disperser used is nerally of the "pipe line" type with baffles. A fine spersion of the melted polyethylene glycols into the ickened mineral oil is obtained by pumping the mixre of the two componenets at high speed through a itic mixer (e.g., C. Ross "Motionless Mixer", or Ken- ; Corporation "Static Mixer").

The following examples illustrate the present invenn without, however, limiting the same thereto.

Example 1

| redients | Parts by Weight |
|---|---|
| lyethylene Glycol* 1500 | 10.0 |
| lyethylene Glycol 400 | 10.0 |

Example 1-Continued

| Ingredients | Parts by Weight |
|---|---|
| Polyethylene Glycol 6000 Distearate | 2.0 |
| Steroid | 0.1 |
| White Petrolatum, U.S.P. | 77.9 |
| Total | 100.0 |

*An equal part mixture of polyethylene glycol 300 and 1540.

PROCEDURE

The polyethylene glycols and polyethylene glycol 6000 distearate are combined and heated with stirring to 65°C. In a suitable stainless steel or glass lined kettle jacketed and equipped for heating and cooling. The steroid is then added to the molten mixture and the heating and stirring continued for approximately 20 minutes until solution of the steroid results. At this time, the petrolatum which has been separately melted is added. After addition is complete, stirring is resumed. Heating is discontinued and the composition allowed to cool with stirring until congealing begins (approximately 46°C.). The resulting ointment has the petrolatum as the continuous phase and the polyethylene glycol having the steroid dissolved therein as the discontinuous phase.

Satisfactory preparations may also be prepared by reversing the above operation, i.e., adding the glycol phase to the melted petrolatum phase.

Example 2

| Ingredients | Parts by Weight |
|---|---|
| Polyethylene Glycol 1500 | 5.0 |
| Polyethylene Glycol 400 | 5.0 |
| Polyethylene Glycol 6000 Distearate | 1.0 |
| Steroid | 0.05 |
| White Petrolatum U.S.P. | 88.95 |
| Total | 100.0 |

The procedure of example 1 is repeated employing the foregoing ingredients. The resulting ointment has the petrolatum as the continuous phase and the polyethylene glycol having the steroid dissolved therein as the discontinuous phase.

Example 3

| Ingredients | Parts by Weight |
|---|---|
| Polyethylene Glycol 1500 | 2.5 |
| Polyethylene Glycol 400 | 2.5 |
| Polyethylene Glycol 6000 Distearate | 0.5 |
| Steroid | 0.025 |
| White Petrolatum U.S.P. | 94.475 |
| Total | 100.0 |

The procedure of example 1 is repeated employing the foregoing ingredients. The resulting ointment has the petrolatum as the continuous phase and the polyethylene glycol having the steroid dissolved therein as the discontinuous phase.

Example 4

| Ingredients | Parts by Weight |
|---|---|
| Polyethylene Glycol 1500 | 10.0 |
| Polyethylene Glycol 400 | 10.0 |

Example 4

| Ingredients | Parts by Weight |
| --- | --- |
| Polyethylene Glycol 6000 Distearate | 2.0 |
| Hydroxylated Lanolin (OHLan-Amerchol) | 5.0 |
| Steroid | 0.1 |
| White Petrolatum U.S.P. | 72.9 |
| Total | 100.0 |

The procedure of example 1 is repeated employing the foregoing ingredients. The hydroxylated lanolin is melted and mixed with the petrolatum prior to admixture with the glycol phase. The resulting ointment has the petrolatum as the continuous phase and the polyethylene glycol having the steroid dissolved therein as the discontinuous phase.

Example 5

| Ingredients | Parts by Weight |
| --- | --- |
| Polyethylene Glycol 1500 | 10.0 |
| Polyethylene Glycol 300 | 10.0 |
| Polyethylene Glycol 6000 Distearate | 2.0 |
| Hydroxylated Lanolin (OHLan-Amerchol) | 5.0 |
| Steroid | 0.1 |
| White Petrolatum, U.S.P. | 72.9 |
| Total | 100.0 |

The procedure of example 1 is repeated employing the foregoing ingredients. The hydroxylated lanolin is melted and mixed with the petrolatum prior to admixture with the glycol phase. The resulting ointment has the petrolatum as the continuous phase and the polyethylene glycol having the steroid dissolved therein as the discontinuous phase.

Example 6

| Ingredients | Parts by Weight |
| --- | --- |
| Polyethylene Glycol 1500 | 10.0 |
| Polyethylene Glycol 400 | 10.0 |
| Polyethylene Glycol 6000 Distearate | 2.0 |
| Steroid | 0.1 |
| White Petrolatum U.S.P. | 77.9 |
| Total | 100.0 |

The procedure of example 1 is repeated employing the foregoing ingredients. The resulting ointment has the petrolatum as the continuous phase and the polyethylene glycol having the steroid dissolved therein as the discontinuous phase.

Example 7

| Ingredients | Parts by Weight |
| --- | --- |
| Polyethylene Glycol 1500 | 5.0 |
| Polyethylene Glycol 400 | 5.0 |
| Polyethylene Glycol 6000 Distearate | 1.0 |
| Tween 65 (Polysorbate 65, F.C.C.) | 3.0 |
| Steroid, Micronized Powder (10–20 micron particle size) | 0.1 |
| Plastibase 50W (mineral oil gelled with polyethylene | 85.9 |
| Total | 100.0 |

PROCEDURE

The polyethylene glycol 1500, polyethylene glycol 400, and polyethylene glycol 6000 distearate are added in a suitable size stainless steel container, melted together on a steam bath by heating to 65°C., and stirred mechanically with a propeller type stirrer while adding one-half of the indicated quantity of the steroid. The stirring is continued until the steroid is dissolved. The temperature of the solution is then reduced to approximately 50°C.

In a jacketed planetary type mixer (Groen type), approximately 90% of the indicated quantity of Plastibase 50W is added and warmed to approximately 42°C. by circulating 48° to 50°C water in the jacket while slowly mixing. In a separate stainless steel container, the Tween 65 is melted by heating on a steam bath to 70°C.

While stirring the Plastibase 50W at slow speed, the hot polysorbate 65 is added slowly and mixed for approximately 4 minutes. While continuing to stir slowly, the glycol solution containing the steroid is added and mixed for approximately 5 minutes.

The warm batch is passed through a suitable size Static Mixer (Kenics Corp., Static Mixer or Ross corp.'s Motionless Mixer) using a high capacity screw type pump (Moyno Pump). The batch is allowed to cool to room temperature spontaneously.

A concentrate of the remaining one-half of the micronized steroid prepared by mixing with a portion of the 10% withheld Plastibase 50W using a planetary type mixer (Hobart type mixer), is passed through a three roll type roller mill and diluted with the remaining Plastibase 50W in a planetary type mixer. When mixed (approximately 10 mins. mixing time required), the concentrate is added to the main portion of the batch and mixed at slow speed for approximately 15 minutes using a planetary type mixer (Groen type mixer). The resulting ointment has the Plastibase 50W as the continuous phase and the polyethylene glycol having 50% of the steroid dissolved therein as the discontinuous phase. The remainder of the steroid is dispersed in the Plastibase 50W.

Example 8

| Ingredients | Parts by Weight |
| --- | --- |
| Polyethylene Glycol 1500 | 5.0 |
| Polyethylene Glycol 400 | 5.0 |
| Polyethylene Glycol 6000 Distearate | 1.0 |
| Steroid, Micronized Powder (10–20 micron particle size) | 0.1 |
| Plastibase 50W | 88.9 |
| Total | 100.0 |

PROCEDURE

In a planetary type mixer (Groen type), about 90% of the indicated quantity of Plastibase 50W is added and held until needed. The polyethylene glycol 1500, polyethylene glycol 400 and polyethylene glycol 6000 distearate are added in a suitable size stainless steel container, melted together on a steam bath by heating to 65°C, and stirred mechanically with a propeller type stirrer while adding one-half of the indicated quantity of the steroid. The stirring is continued until the steroid is dissolved. The glycol solution is then allowed to cool and congeal.

When cold and congealed, the material is passed through a three roll mill making two passes through the mill. A concentrate of the remaining one-half of the steroid powder is prepared separately by mixing with a portion of a 10% reserved quantity of Plastibase 50W.

his concentrate is passed through a three roll roller mill, combined with the remaining Plastibase 50W and milled glycol fraction, mixed in a planetary mixer (Hobart type mixer) and blend passed through a three roll roller mill.

The milled fraction is added to the main portion of the Plastibase 50W in the Groen mixer and mixed for approximately 10 minutes. The entire batch is then passed through a suitable size Static Mixer using a high capacity screw type pump (Moyno Pump). The resulting ointment has the Plastibase 50W as the continuous phase and the polyethylene glycol having 50% of the steroid dissolved therein as the discontinuous phase. The remainder of the steroid is dispersed in the Plastibase 50W.

Example 9

| Ingredients | Parts by Weight |
|---|---|
| Polyethylene Glycol 1500 | 5.0 |
| Polyethylene Glycol 400 | 5.0 |
| Polyethylene Glycol 6000 Distearate | 1.0 |
| Steroid, Micronized Powder (10–20 micron particle size) | 0.1 |
| Plastibase 50W | 88.9 |
| Total | 100.0 |

PROCEDURE

The polyethylene glycol 1500, polyethylene glycol 400 and polyethylene glycol 6000 distearate are added in a suitable size stainless steel container, melted together on a steam bath by heating to 65°C., and stirred mechanically with a propeller type stirrer while adding one-half of the indicated quantity of steroid. The stirring is continued until the steroid is dissolved. The temperature of the solution is then reduced to approximately 50°C.

Approximately 90% of the indicated quantity of Plastibase 50W is placed in a jacketed planetary type mixer (Groen type) and warmed to approximately 42°C by circulating 48° to 50°C water while slowly mixing. The warm glycol solution containing the steroid is added slowly while continuing slow mixing for approximately 5 minutes. The warm batch is then passed through a suitable size Static Mixer using a high capacity screw type pump (Moyno Pump). The batch is allowed to cool to room temperature spontaneously.

A concentrate of the remaining one-half of the micronized steroid is prepared by mixing with a portion of the 10% withheld Plastibase 50W using a planetary type mixer (Hobart type mixer). This concentrate is passed through a three roll type roller mill and diluted with the remaining Plastibase 50W in a planetary type mixer. After approximately 10 minutes mixing time, it is added to the main portion of the batch and mixed at slow speed for approximately 15 minutes using a planetary type mixer (Groen type mixer). The resulting ointment has the Plastibase 50W as the continuous phase and the polyethylene glycol having 50% of the steroid dissolved therein as the discontinuous phase. The remainder of the steroid is dispersed in the Plastibase 50W.

Example 10

| Ingredients | Parts by Weight |
|---|---|
| Polyethylene Glycol 1500 | 5.0 |

Example 10-Continued

| Ingredients | Parts by Weight |
|---|---|
| Polyethylene Glycol 400 | 5.0 |
| Polyethylene Glycol 6000 Distearate | 1.0 |
| Tween 65 (Polysorbate 65 F.C.C.) | 5.0 |
| Steroid, Micronized Powder (10–20 micron particle size) | 0.1 |
| Plastibase 50W | 83.9 |
| Total | 100.0 |

PROCEDURE

The polyethylene glycol 1500, polyethylene glycol 400 and polyethylene glycol 6000 distearate are added in a suitable size stainless steel container, melted together on a steam bath by heating to 65°C, and stirred mechanically with a propeller type stirrer while adding one-half of the indicated quantity of steroid. The stirring is continued until the steroid is dissolved. The Tween 65 is separately melted by heating to 70°C.

Approximately 90% of the quantity of Plastibase 50W is placed in a jacketed planetary mixer (Groen type) and while mixing at slow speed, the hot Tween 65 is slowly added. Mixing is continued for approximately 5 minutes, then the molten glycol solution containing the steroid is added slowly. The mixing is continued a slow speed for approximately 15 minutes. The mixture is cooled to 30°C by passing cooling water through the mixer jacket while stirring at slow speed.

A concentrate of the remaining one-half of the micronized steroid is prepared by mixing with a portion of the 10% withheld Plastibase 50W using a planetary type mixer (Hobart type mixer). This concentrate is passed through a three roll type roller mill and diluted with the remaining Plastibase 50W in a planetary type mixer. After approximately 10 minutes mixing time, it is added to the main portion of the batch and mixed at slow speed for approximately 15 minutes. The resulting ointment has the Plastibase 50W as the continuous phase and the polyethylene glycol having 50% of the steroid dissolved therein as the discontinuous phase. The remainder of the steroid is dispersed in the Plastibase 50W.

What is claimed is:

1. A composition comprising from about 0.01% by weight to about 0.5% by weight of 21-chloro-9α-fluoro-Δ$^4$-pregnene-11β,16α,17α-triol-3,20-dione 16,17-acetonide, from about 1% by weight to about 35% by weight of polyethylene glycol having a molecular weight of from about 200 to about 7500, up to about 5% by weight of a bodying agent, and from about 65% by weight to about 99% by weight of oleaginous materials, at least part of the steroid being dissolved in the polyethylene glycol, and the foregoing solution of steroid in polyethylene glycol being dispersed in the oleaginous material.

2. A composition according to claim 1 wherein part of the steroid is suspended in the oleaginous material.

3. A composition according to claim 1 containing up to about 7% of a dispersing modifier.

4. A composition according to claim 1 containing from about 0.025 to about 0.2% by weight of steroid, from about 2.5 to about 25% of polyethylene glycol, and from about 70 to about 95% by weight of oleaginous material.

5. A composition according to claim 1 wherein the oleaginous material is petrolatum or mineral oil thickened with polyethylene.

6. A composition according to claim 1 wherein the bodying agent is polyethylene glycol 6000 distearate.

7. A composition according to claim 2 containing up to about 7% of a dispersing modifier.

8. A composition according to claim 2 wherein the bodying agent is polyethylene glycol 6000 distearate.

9. A composition according to claim 1 wherein said polyethylene glycol contains in solution at least about 80% of that amount of steroid required to form a saturated solution of the steroid in the polyethylene glycol.

10. A composition according to claim 1 wherein said polyethylene glycol contains in solution that amount of steroid required to form a saturated solution of the steroid in the polyethylene glycol.

11. A composition comprising from about 0.01% by weight to about 0.5% by weight of 21-chloro-9α-fluoro-$\Delta^4$-pregnene-11β,16α,17α-triol-3,20-dione 16,17-acetonide, from about 1% by weight to about 35% by weight of polyethylene glycol having a molecular weight of from about 200 to about 7500, up to about 5% by weight of a bodying agent, and from about 65% by weight to about 99% by weight of oleaginous material, prepared by the process of dissolving at least part of the steroid in the polyethylene glycol to form a solution thereof, and mixing the foregoing solution of steroid in polyethylene glycol with the oleaginous material.

12. A composition according to claim 11 including the step of suspending part of the steroid in the oleaginous material.

13. A composition according to claim 11 containing from about 0.025 to about 0.2% by weight of steroid, from about 2.5 to about 25% of polyethylene glycol, and from about 70 to about 95% by weight of oleaginous material.

14. A composition according to claim 11 wherein said polyethylene glycol contains in solution at least about 80% of that amount of steroid required to form a saturated solution of the steroid in the polyethylene glycol.

15. A composition according to claim 11 wherein said polyethylene glycol contains in solution that amount of steroid required to form a saturated solution of the steroid in the polyethylene glycol.

16. A process for forming a topical ointment formulation which formulation comprises from about 0.01 to about 0.5% by weight of 21-chloro-9α-fluoro-$\Delta^4$-pregnene-11β,16α,17α-triol-3,20-dione 16,17-acetonide, from about 1 to about 35% by weight of polyethylene glycol having a molecular weight of from about 200 to about 7500, up to about 5% by weight of a bodying agent, and from about 65 to about 99% by weight of oleaginous material, including the steps of dissolving at least part of the steroid in the polyethylene glycol to form a solution thereof, and mixing said solution with the oleaginous material.

17. The process of claim 16 including the steps of heating the polyethylene glycol to above its melting point, adding at least part of the steroid to the melted polyethylene glycol and thereafter continuing the heating with agitation until the desired solubilized level of steroid is dissolved in the polyethylene glycol.

18. The process of claim 16 wherein all of the steroid is dissolved in the polyethylene glycol.

19. The process of claim 16 including the steps of dispersing a portion of the steroid in particulate form with a portion of the oleaginous material in liquid form, mixing the dispersion of said steroid and oleaginous material with the remainder of said oleaginous material, and thereafter mixing the solution of steroid and polyethylene glycol with said oleaginous material.

20. The process of claim 16 wherein said polyethylene glycol contains in solution at least about 80% of that amount of steroid required to form a saturated solution of the steroid in the polyethylene glycol.

21. The process of claim 16 wherein said polyethylene glycol contains in solution that amount of steroid required to form a saturated solution of the steroid in the polyethylene glycol.

* * * * *

UNITED STATES PATENT OFFICE
CERTIFICATE OF CORRECTION

PATENT NO. : 3,892,856
DATED : July 1, 1975
INVENTOR(S) : John Anthony Hill et al.

It is certified that error appears in the above-identified patent and that said Letters Patent are hereby corrected as shown below:

On the abstract page, line [75],"East" should read --New--.
Column 1, line 11, "provice" should read --provide--.
Column 3, line 30, "uniformm" should read --uniform--.
Column 4, line 14, "In" should read --in--.
Column 6, line 65, after "roll" insert --roller--.

Signed and Sealed this seventh Day of October 1975

[SEAL]

Attest:

RUTH C. MASON
*Attesting Officer*

C. MARSHALL DANN
*Commissioner of Patents and Trademarks*